United States Patent [19]

Welborn

[11] 4,024,877

[45] May 24, 1977

[54] VEGETABLE PEAS AND SEPARATING THE HULLS THEREFROM AND THE LIKE

[76] Inventor: Woodrow W. Welborn, Rte. No. 3, Laurel, Mich. 39440

[22] Filed: Mar. 4, 1975

[21] Appl. No.: 555,675

[52] U.S. Cl. .............................. 130/30 H; 209/86; 209/299
[51] Int. Cl.² ........................................ A01D 91/00
[58] Field of Search .............. 209/83, 85, 86, 288, 209/293, 294, 296, 299; 133/3 B, 3 A, 3 C; 130/30 H

[56] References Cited

UNITED STATES PATENTS

| 457,538 | 8/1891 | Moulton | 130/30 H |
| 1,592,697 | 7/1926 | Hovda | 209/86 X |
| 1,620,644 | 3/1927 | Goffin | 130/30 H |
| 2,615,567 | 10/1952 | Campbell | 209/85 X |
| 2,992,739 | 7/1961 | Fazio | 209/86 X |
| 3,147,759 | 9/1964 | Perkins | 209/86 X |

FOREIGN PATENTS OR APPLICATIONS

| 239,703 | 7/1969 | U.S.S.R. | 209/86 |

Primary Examiner—Drayton E. Hoffman
Assistant Examiner—Joseph J. Rolla
Attorney, Agent, or Firm—George R. Douglas, Jr.; Anthony D. Cennamo

[57] ABSTRACT

Method and apparatus for shelling vegetable peas and separating the hulls from the pea, in which the method and apparatus includes a tumbler and agitator for displacing the pea from the hull, agitator which shells the peas, and a separator of novel design and function for separating the hulls therefrom.

2 Claims, 5 Drawing Figures

VEGETABLE PEAS AND SEPARATING THE HULLS THEREFROM AND THE LIKE

CROSS REFERENCE TO RELATED PRIOR ART AND REFERENCES

The present invention is an improvement and departure from prior art devices such as found in the following patents.

Satake, U.S. Pat. No. 3,750,884
Barton, U.S. Pat. No. 3,578,161
Gaddie, U.S. Pat. No. 3,061,094

BRIEF SUMMARY OF THE INVENTION

The invention relates generally to the shelling of agricultural food products from their hulls or vegetable bodies in which they are found, and more particularly the invention relates particularly to the shelling and separating of the hulls or vegetable bodies from the desirable vegetable components such as the peas or beans found therein.

DESCRIPTION OF THE PRIOR ART

In the past farmers who grew agricultural food products such as peas and butterbeans and the like, would harvest their crops and then the whole family would sit around and spend hours hand-shelling and separating the hulls from the peas or beans.

In order to reduce the cost of labor and time in shelling and separating these vegetables many apparatus appear to have been invented. Most of these inventions will do a fair job of shelling the peas, but all of them have a major problem in separating the hulls and keeping trash out of the edible peas. They also have a problem in that too many of the peas fall through the screening devices around the tumbler without being shelled. This again requires considerable labor and time in picking out those peas which were not shelled from the hulls of the shelled peas and either hand shelling them or recycling them through the sheller. Also, extensive labor and time is required in hand picking the hulls and trash from the edible peas, all to no great advantage in time or costs.

BACKGROUND OF THE INVENTION

The invention is a method and apparatus for accepting vegetable bodies containing desirable vegetable components which are distinguished by being found under a given predetermined radial dimension distinguished further for separation by being separated from undesirable vegetable bodies. The invention comprises a tumbling in a given apparatus the vegetable as found in nature within a motor driven drum, agitating groups of these vegetable bodies within said drum and rotating an agitating element driven by a variable speed motor to shell or detach the vegetable bodies from the desirable vegetable components, separating the vegetable bodies from the desired vegetable components by sets of separating elbow-shaped passage ways disposed throughout the periphery of the drum for passage of the vegetable components away from the vegetable bodies or hulls. The vegetable body or hulls remain within the drum while the desirable vegetable components are passed through the elbow-shaped passage ways into a trough where they may be shakened to be separated from undesirable elements therein. The rotation of the motor drum and the agitator are at a different rate of speed and may be in a clock wise or counter clock wise relation to each other. The vegetable bodies and components are introduced in their whole relation through a removable hatch in the drum.

The invention is a method and apparatus for accepting vegetable bodies containing desirable vegetable components which are distinguished by being found under a given predetermined radial dimension distinguished further for separation by being separated from undesirable vegetable bodies. The invention comprises a tumbling in a given apparatus the vegetable as found in nature within a motor driven drum, agitating groups of these vegetable bodies within said drum and rotating an agitating element driven by a variable speed motor to shell or detach the vegetable bodies from the desirable vegetable components, separating the vegetable bodies from the desired vegetable components by sets of separating elbow-shaped passage ways disposed throughout the periphery of the drum for passage of the vegetable components away from the vegetable bodies or hulls. The vegetable body or hulls remain within the drum while the desirable vegetable components are passed through the elbow-shaped passage ways into a trough where they may be shakened to be separated from undesirable elements therein. The rotation of the motor drum and the agitator are at a different rate of speed and may be in a clock wise of counter clock wise relation to each other. The vegetable bodies and components are

FIELD OF AND SUMMARY OF THE INVENTION

It is an object and advantage of the present invention to provide an apparatus and method for automatically shelling peas or beans and separating their components so that the hulls and trash are removed and the edible product is collected in a trough.

A further and additional object and advantage of the present invention is to provide that during the operation of a sheller of the crop, which has been gathered from the field, the product gathered from the field is placed in a tumbler which rotates at a desired rate of revolutions per minute and an agitator which rotates at a different rate of revolutions per minute processes these crops for separating the hulls or undesirable portions from the edible product, and the edible product is passed through an elbow-shaped aperture in the drum where the edible product is then collected in a trough for moving the peas from under the tumbler into an empty container at one end thereof.

A further object and feature of the present invention is to provide for the shelling of peas which fall into a separator and are then dumped out of the tumbler, leaving the hull and trash inside of the tumbler to be dumped out after all peas have been shelled therefrom, and the shelled pea is dumped or passed through an elbow-contoured aperture within the periphery of the drum so that the pea or vegetable body is received within a trough where it is vibrated so that they are collected into a given container.

BRIEF DESCRIPTION OF THE DRAWINGS OF THE INVENTION

The above and other objects and advantages of the invention will become apparent upon full consideration of the following detailed description and accompanying drawings in which.

Figure 1:
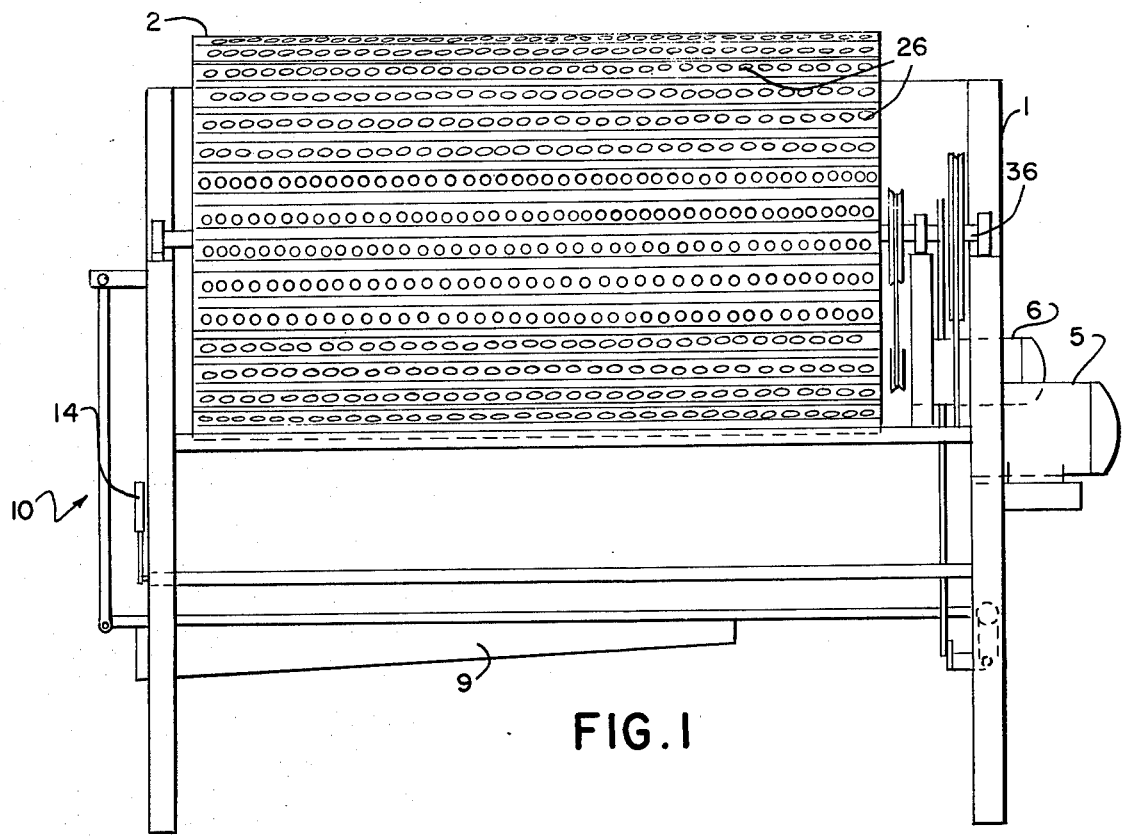
FIG. 1 is a front elevation view of a preferred embodiment of the present invention.
Figure 3:
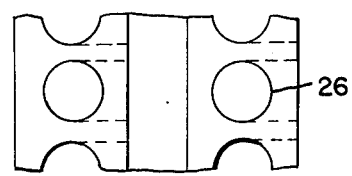
Figure 3A:
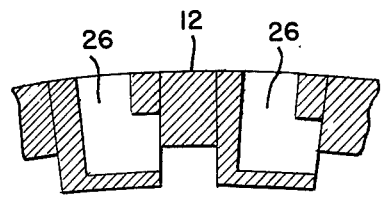
Figure 4:
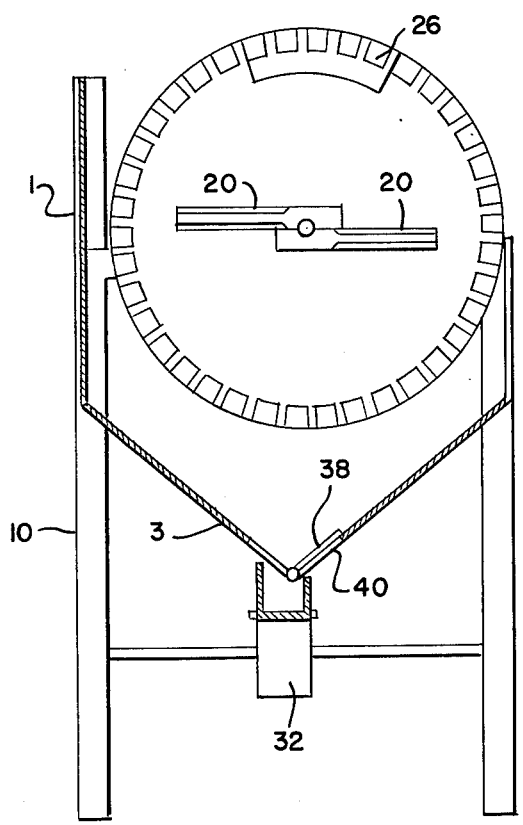

FIG. 3 fragmentary or broken away sectional view of the elbow-shaped apertures of the separator elements in the drum according to a preferred and distinctive embodiment of the present invention;

FIG. 3a is a cross-sectional view of the separator of FIG. 3;

FIG. 4 is a section of a left side elevational view of the preferred embodiment of the invention shown in FIG. 1.

Referring now to the drawings there is shown a frame structure or body comprising essentially of a frame 10 which is provided for mounting a tumblar drum 12 which is motor driven by a V belt 14 connected to a drive motor 16 with a pulley 18 shown in FIG. 1.

There are positioned and appropriately located throughout the center of the tumblar drum 12 a set of agitator elements 20, 20 as shown in FIG. 4 which are also driven by a motor by means of a V belt 22 driven from a variable speed motor 24. The tumbler drum 12 and the agitators 20, 20 may turn in a clock wise rotation at different speeds relative to each other, or they may turn in counter clock wise directions to each other at the same or variable rate of revolutions per minute.

Throughout the peripheral surface of the drum there is shown as illustrated in FIGS. 3 and 3a a series of apertures forming elbow-shaped passage ways 26, 26. The vegetable bodies or peas or beans as found in the garden or in the field or collected and a group of them are placed and loaded within the tumbler drum 12 through a removable hatch 28 shown in FIG. 2 which is locked in place during the rotation, shelling and separating processes. The rotation of the tumbler drum 12 and the agitators 20, 20 act upon the shell or hull of the vegetable bodies so that the peas or beans, referred to herein as the desirable vegetable components are separated from the hull or shell thereof. The shelled pea or bean is gathered up into a given elbow-shaped aperture passage way 26,26, carried around with the revolution of the drum 12 26, 26, by means of the force due to centrifugal action of rotation, the pea or desirable vegetable body is passed there through and dumped into a shaker trough 32 leaving the hull or shell within the tumbler drum 12.

Figure 2:
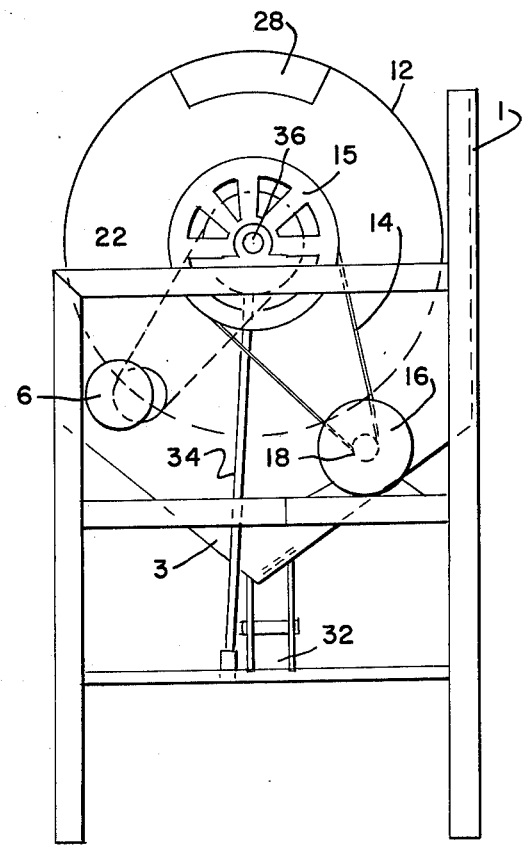
FIG. 2 is a right side elevation view of the invention shown in FIG. 1.

The shaker trough 32 is activated by a cam-operating mechanism 34 shown in FIG. 2 attached to the shaft 36 of the tumbler drum 12. A gate 38 shown in FIG. 4 is provided at the top of the shaker trough 32 which is opened for allowing shelled peas or beans to fall within the shaker trough 32, and is then closed when the hulls left in the tumbler 12 are emptied through an opening 40 at the top of the shaker trough 32. The shelled peas or beans which have fallen into the shaker trough 32 are moved through the trough by vibrating due to the action of the cam-operating mechanism 34 so that they are emptied at one end into a container (not shown).

By means of the present invention shown and apparatus and method for providing automatic pea shelling including a means and method for tumbling of the vegetable body as found in nature by placing it within the rotating tumbler drum, agitating the vegetable body for shelling the unshelled vegetable components therefrom, a separator for separating the shell pea from the hull, and a shaker trough for collecting the shelled peas into a container. A particular and unique feature of the separator is that it is constructed of a contoured passage way or elbow-shaped aperture throughout the periphery of the drum in the form of a bend which completely separates the pea or bean from its hull or its shell, respectively.

Additional embodiments of the invention in this specification will occur to others and therefore it is intended that the scope of the invention be limited only by the amended claims and not by the embodiments described hereinabove. Accordingly, reference should be made to the following claims in determining the full scope of the invention.

What is claimed is:

1. Method of accepting vegetable bodies containing desired vegetable components distinguished by being under a given predetermined radial dimension and unsavable vegetable bodies comprising the steps of: introducing the unseparated vegetable components and vegetable bodies into a motor driven drum having a shaft through a removable hatch, tumbling a selected group of vegetable bodies within the driven drum, agitating groups of vegetable bodies within said drum by an essentially coaxially rotating agitating element driven by a variable speed motor to shell or detach the vegetable bodies from the desired vegetable components, separating the vegetable bodies from the desired vegetable components by sets of separating elbow shaped passage ways extending inwardly of the interior of said drum and disposed throughout the periphery of the drum for passage of the vegetable components away from the vegetable bodies which remain within the drum, the speed of the driven drum being at a different rate than the speed of the rotating agitating element, collecting the desirable vegetable components within a shaker trough positioned essentially below the drum, and shaking the shaker trough by a cam operating mechanism attached to the shaft of the motor driven drum, the rate of rotation of the motor drum being distinctly different from that of the rotation of the agitating element.

2. Apparatus for accepting vegetable bodies containing desired vegetable components distinguished by being under a given predetermined radial dimension and unsavable vegetable bodies comprising means introducing the unseparated vegetable components and vegetable bodies into a motor driven drum having a shaft through a removable hatch, means for tumbling a selected group of vegetable bodies within the driven drum, means for agitating groups of vegetable bodies within said drum by an essentially coaxially rotating agitating element driven by a variable speed motor to shell or detach the vegetable bodies from the desired vegetable components, means for separating the vegetable bodies from the desired vegetable components by sets of separating elbow shaped passage ways extending inwardly of the interior surface of said drum and disposed throughout the periphery of the drum for passage of the vegetable components away from the vegetable bodies which remain within the drum, the speed of the driven drum being at a different rate than the speed of the rotating agitating element, means for collecting the desirable vegetable components within a shaker trough positioned essentially below the drum and means for shaking the shaker trough by a cam operating mechanism attached to the shaft of the motor driven drum, the rate of rotation of the motor drum being distinctly different from that of the rotation of the agitating element.

* * * * *

UNITED STATES PATENT AND TRADEMARK OFFICE
CERTIFICATE OF CORRECTION

PATENT NO. : 4,024,877
DATED : May 24, 1977
INVENTOR(S) : Woodrow W. Welborn

It is certified that error appears in the above-identified patent and that said Letters Patent are hereby corrected as shown below:

Change the state of the address of the Applicant to -- Mississippi -- in lieu of "Mich."

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*